(12) United States Patent
Oikawa et al.

(10) Patent No.: US 12,250,419 B2
(45) Date of Patent: Mar. 11, 2025

(54) LIVE DISTRIBUTION SYSTEM, ESTIMATION METHOD, AND INFORMATION STORAGE MEDIUM

(71) Applicant: RAKUTEN GROUP, INC., Tokyo (JP)

(72) Inventors: Yuto Oikawa, Tokyo (JP); Yuki Nakayama, Tokyo (JP); Koji Murakami, Eastchester, NY (US)

(73) Assignee: RAKUTEN GROUP, INC., Tokyo (JP)

( * ) Notice: Subject to any disclaimer, the term of this patent is extended or adjusted under 35 U.S.C. 154(b) by 78 days.

(21) Appl. No.: 18/459,045

(22) Filed: Aug. 31, 2023

(65) Prior Publication Data

US 2024/0089519 A1 Mar. 14, 2024

(30) Foreign Application Priority Data

Sep. 12, 2022 (JP) .................................. 2022-144377

(51) Int. Cl.
*H04N 21/2668* (2011.01)
*G06F 40/279* (2020.01)
(Continued)

(52) U.S. Cl.
CPC ......... *H04N 21/235* (2013.01); *G06F 40/279* (2020.01); *H04N 21/2187* (2013.01); *H04N 21/251* (2013.01)

(58) Field of Classification Search
None
See application file for complete search history.

(56) References Cited

U.S. PATENT DOCUMENTS

| 2006/0095521 A1 | 5/2006 | Patinkin |
| 2010/0017487 A1 | 1/2010 | Patinkin |

(Continued)

FOREIGN PATENT DOCUMENTS

| JP | 2008529105 A | 7/2008 |
| JP | 2022-506274 A | 1/2022 |
| JP | 2022122491 A | 8/2022 |

OTHER PUBLICATIONS

Taleb Mohammed et.al. "Detection of toxicity in social media based on Natural Language Processing methods", 2022 International Conference on Intelligent Systems and Computer Vision (ISCV), IEEE, May 18, 2022, pp. 1-7, XP034141280, DOI: 10.1109/ISCV54655.2022.9806096 [retrieved on Jun. 29, 2022].

(Continued)

*Primary Examiner* — Brian T Pendleton
*Assistant Examiner* — Jean D Saint Cyr
(74) *Attorney, Agent, or Firm* — HEA Law PLLC

(57) ABSTRACT

Provided is a live distribution system including at least one processor configured to: acquire a viewer comment input by a viewer of a live distribution service; estimate whether the viewer comment is appropriate based on a first model that has learned a first training comment; determine whether a first score relating to an estimation accuracy of the first model satisfies a predetermined first criterion; avoid, when the first score is determined to satisfy the first criterion, estimation based on a second model that has learned a second training comment; and estimate, when the first score is determined not to satisfy the first criterion, whether the viewer comment is appropriate based on the second model.

15 Claims, 9 Drawing Sheets

(51) Int. Cl.
   *H04N 21/2187* (2011.01)
   *H04N 21/235* (2011.01)
   *H04N 21/25* (2011.01)
   *H04N 21/422* (2011.01)
   *H04N 21/43* (2011.01)
   *H04N 21/431* (2011.01)
   *H04N 21/442* (2011.01)
   *H04N 21/454* (2011.01)
   *H04N 21/475* (2011.01)
   *H04N 21/488* (2011.01)
   *H04N 21/81* (2011.01)

(56) References Cited

U.S. PATENT DOCUMENTS

| | | | | |
|---|---|---|---|---|
| 2013/0318099 A1* | 11/2013 | Sano | ............... | G06F 16/7867 |
| | | | | 707/748 |
| 2018/0293278 A1* | 10/2018 | Kapoor | ............... | G06F 40/30 |
| 2020/0142999 A1 | 5/2020 | Pedersen | | |
| 2022/0114679 A1* | 4/2022 | Lee | ............... | G06F 40/166 |

OTHER PUBLICATIONS

Search Report of Feb. 15, 2024, for corresponding EP Patent Application No. 23194444.8. pp. 1-10.
Office Action of Oct. 29, 2024, for corresponding JP Patent Application No. 2022-144377 with English translation, pp. 1-7.

* cited by examiner

| MOVING IMAGE ID | DISTRIBUTOR ID | TITLE OF MOVING IMAGE | ACTUAL DATA ON MOVING IMAGE | ACTUAL DATA ON VIEWER COMMENT | VIEWER ID | DATE AND TIME OF POST | ESTIMATION RESULT |
|---|---|---|---|---|---|---|---|
| v00001 | d00001 | XYZ SHOP | v00001.mpg | WHAT IS THIS PRODUCT!? | v00001 | 2022/8/31 16:43:43 | APPROPRIATE |
| | | | | I WANT THIS! | v00002 | 2022/8/31 16:43:42 | APPROPRIATE |
| | | | | THIS IS NO GOOD | v00003 | 2022/8/31 16:43:40 | INAPPROPRIATE |
| ... | ... | ... | ... | ... | ... | ... | ... |

LIVE DISTRIBUTION SYSTEM, ESTIMATION METHOD, AND INFORMATION STORAGE MEDIUM

CROSS-REFERENCE TO RELATED APPLICATION

The present application claims priority from Japanese application JP2022-144377, filed on Sep. 12, 2022, the disclosures of which are incorporated by reference herein.

BACKGROUND OF THE INVENTION

1. Field of the Invention

The present disclosure relates to a live distribution system, an estimation method, and an information storage medium.

2. Description of the Related Art

Hitherto, there has been known a live distribution service which distributes information such as a moving image, sound, or the like in real time. In the live distribution service, a viewer may input an inappropriate viewer comment, and hence it is required to estimate whether or not a viewer comment is appropriate. For example, in Japanese Patent Translation Publication No. 2022-506274, there is described a technology in which whether or not a training comment is appropriate is manually classified to create training data, and whether or not an unclassified comment is appropriate is classified based on a model which has learned the training data through use of a machine learning method.

SUMMARY OF THE INVENTION

For example, when the technology of Japanese Patent Translation Publication No. 2022-506274 is applied to the live distribution service, it is possible to estimate whether or not the viewer comment is appropriate through use of the model as described in Japanese Patent Translation Publication No. 2022-506274. In this respect, an estimation accuracy may not be sufficient when only one model is used, and hence it is conceivable to simultaneously use a plurality of models which have learned pieces of training data different from one another. However, when the estimation based on the plurality of models is executed for all viewer comments, a processing load on a computer which estimates whether or not the viewer comments are appropriate increases.

One object of the present disclosure is to reduce a processing load on a computer which estimates whether or not a viewer comment in a live distribution service is appropriate.

According to at least one embodiment of the present disclosure, there is provided a live distribution system including at least one processor configured to: acquire a viewer comment input by a viewer of a live distribution service; estimate whether the viewer comment is appropriate based on a first model that has learned a first training comment; determine whether a first score relating to an estimation accuracy of the first model satisfies a predetermined first criterion; avoid, when the first score is determined to satisfy the predetermined first criterion, estimation based on a second model that has learned a second training comment; and estimate, when the first score is determined not to satisfy the predetermined first criterion, whether the viewer comment is appropriate based on the second model.

BRIEF DESCRIPTION OF THE DRAWINGS

FIG. 4 is a table for showing an example of a distribution database.

DETAILED DESCRIPTION OF THE INVENTION

1. Overall Configuration of Live Distribution System

Figure 1:
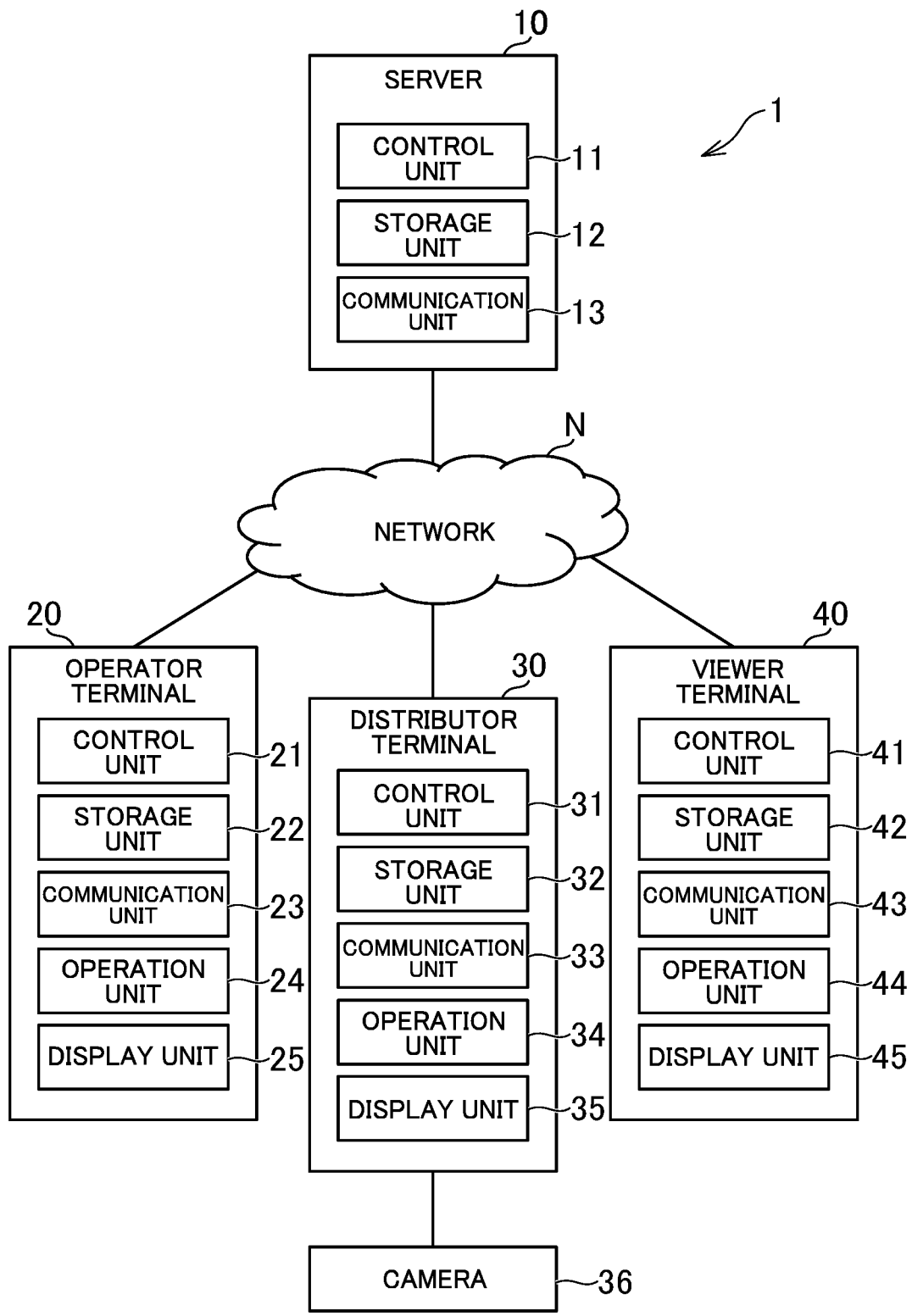
FIG. 1 is a diagram for illustrating an example of an overall configuration of a live distribution system.

Description is now given of an example of at least one embodiment of a live distribution system according to the present disclosure. FIG. 1 is a diagram for illustrating an example of an overall configuration of the live distribution system. For example, the live distribution system 1 includes a server 10, an operator terminal 20, a distributor terminal 30, and a viewer terminal 40. Each of the server 10, the operator terminal 20, the distributor terminal 30, and the viewer terminal 40 can be connected to a network N, such as the Internet and a LAN.

The server 10 is a server computer which provides a live distribution service. The live distribution service is a service which distributes information in real time. For example, the server 10 includes a control unit 11, a storage unit 12, and a communication unit 13. The control unit 11 includes at least one processor. The storage unit 12 includes a volatile memory such as a RAM, and a non-volatile memory such as a flash memory. The communication unit 13 includes at least one of a communication interface for wired communication or a communication interface for wireless communication.

The operator terminal 20 is a computer of an operator. The operator is a company which operates the live distribution service. For example, the operator terminal 20 is a personal computer, a tablet terminal, or a smartphone. For example, the operator terminal 20 includes a control unit 21, a storage unit 22, a communication unit 23, an operation unit 24, and a display unit 25. Physical configurations of the control unit 21, the storage unit 22, and the communication unit 23 are the same as those of the control unit 11, the storage unit 12, and the communication unit 13, respectively. The operation unit 24 is an input device such as a touch panel. The display unit 25 is a liquid crystal display or an organic electro luminescence (EL) display.

The distributor terminal 30 is a computer of a distributor. The distributor is a user who distributes information through the live distribution service. For example, the distributor terminal 30 is a personal computer, a tablet terminal, or a smartphone. For example, the distributor terminal 30 includes a control unit 31, a storage unit 32, a communication unit 33, an operation unit 34, and a display unit 35. Physical configurations of the control unit 31, the storage unit 32, the communication unit 33, the operation unit 34, and the display unit 35 are the same as those of the control unit 11, the storage unit 12, the communication unit 13, the operation unit 24, and the display unit 25, respectively. A camera 36 is connected to the distributor terminal 30. The camera 36 may be included inside the distributor terminal 30.

The viewer terminal 40 is a computer of a viewer. The viewer is a user who views or listens to information in the live distribution service. For example, the viewer terminal 40 is a personal computer, a tablet terminal, or a smartphone. For example, the viewer terminal 40 includes a control unit 41, a storage unit 42, a communication unit 43, an operation unit 44, and a display unit 45. Physical configurations of the control unit 41, the storage unit 42, the communication unit 43, the operation unit 44, and the display unit 45 are the same as those of the control unit 11, the storage unit 12, the communication unit 13, the operation unit 24, and the display unit 25, respectively.

Programs stored in the storage units 12, 22, 32, and 42 may be supplied via the network N. The programs stored on computer-readable information storage media may be supplied via reading units (for example, optical disc drives or memory card slots) for reading the information storage media, or via input/output units (for example, USB ports) for input/output of data to/from an external device.

Moreover, it is only required for the live distribution system 1 to include at least one computer, and is not limited to the example of FIG. 1. For example, the live distribution system 1 may include only the server 10, and the operator terminal 20, the distributor terminal 30, and the viewer terminal 40 may exist outside the live distribution system 1. For example, the live distribution system 1 may include only the server 10 and the operator terminal 20, and the distributor terminal 30 and the viewer terminal 40 may exist outside the live distribution system 1.

2. Overview of Live Distribution System

In the at least one embodiment, a live distribution service which distributes moving images for advertising products is exemplified. The live distribution service may be of any type, and is not limited to the example of the at least one embodiment. For example, the live distribution service may be a live distribution service which distributes a live game, a seminar, a moving image for advertising a service, singing or playing a musical instrument by the distributor, chatting with the distributor, or a variety show. In the live distribution service, not both of the image and the sound, but only any one of the image and the sound may be distributed. In the at least one embodiment, the viewer means to include a person who only views the image and a person who only listens to the sound.

Figure 2:
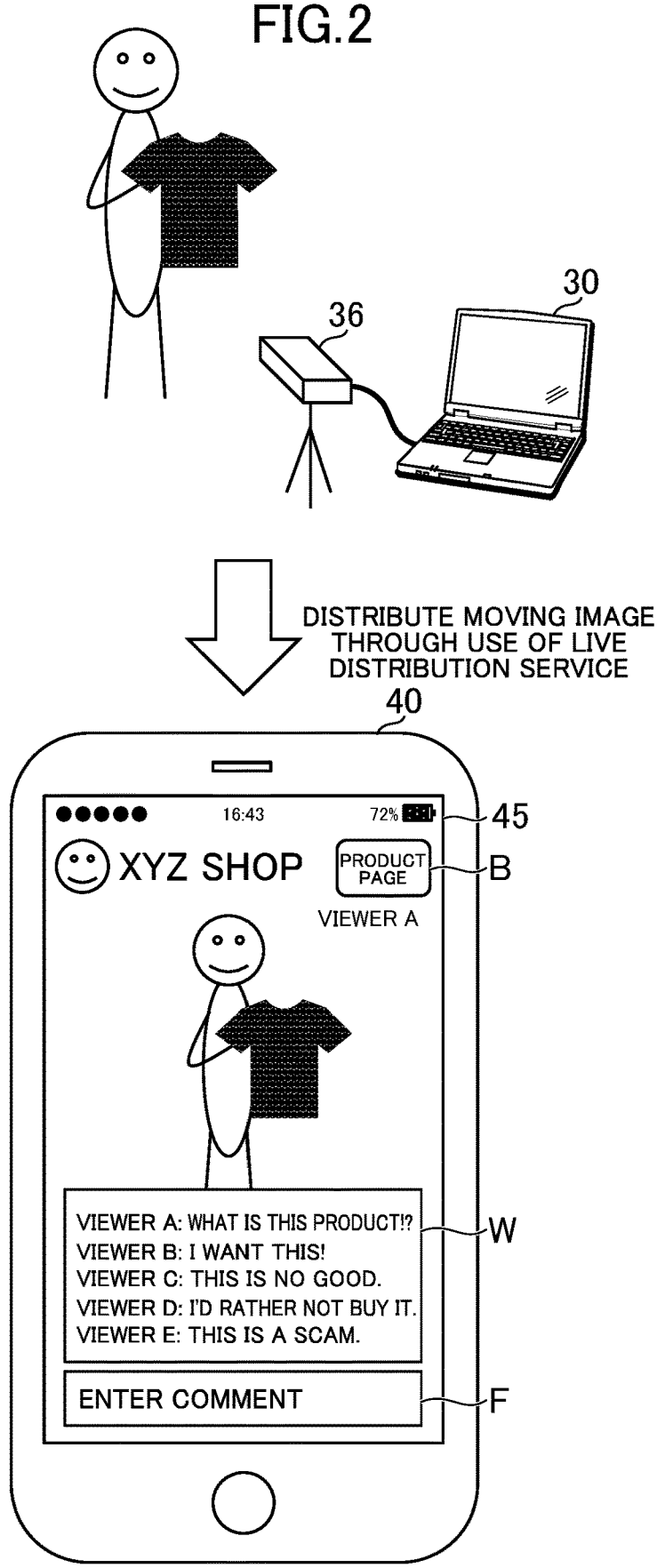
FIG. 2 is a view for illustrating an example of a moving image distributed in the live distribution service.

FIG. 2 is a view for illustrating an example of a moving image distributed in the live distribution service. For example, the distributor advertises a product sold in an online shopping mall in front of the camera 36. The distributor terminal 30 transmits the moving image generated by the camera 36 to the server 10. The server 10 distributes, in real time, the moving image received from the distributor terminal 30 to the viewer terminals 40 of many and unspecified viewers. On the display unit 45 of the viewer terminal 40, the moving image is displayed in real time. When the viewer likes a product in the moving image being viewed, the viewer can purchase the product by selecting a button B.

For example, the viewer can input a comment in an input form F. The comment input by the viewer is hereinafter referred to as "viewer comment." The viewer comment can include any string. For example, the viewer comment is a message directed to the distributor or other viewers. The viewer comment is not required to be a message directed to another person, but may have content such as a soliloquy. For example, a plurality of viewer comments are arranged in a chronological order, and are displayed on a window W. As illustrated in FIG. 2, various viewer comments such as reviews about the product and impressions of the viewers are displayed on the window W. In the at least one embodiment, the viewer comments are disclosed to all persons including the distributor and the viewers in principle.

For example, the viewer may input an inappropriate viewer comment. The inappropriate comment includes content violating terms of use of the live distribution service. The inappropriate viewer comment may also be considered as a viewer comment which should not be disclosed. For example, the inappropriate viewer comment includes defamation, obscene content, other content with which others feel uncomfortable, and meaningless content. In the example of FIG. 2, viewer comments input by viewers C and E are inappropriate.

For example, it takes large amounts of time and effort for an administrator to check all of the viewer comments to delete inappropriate viewer comments. In the at least one embodiment, in order to reduce the time and effort of the administrator, it is estimated whether or not the viewer comment is appropriate based on learning models which use machine learning methods. As the machine learning method itself, various methods can be used. For example, the machine learning model may be a model which uses a machine learning method of any one of the supervised learning, the semi-supervised learning, and the unsupervised learning. A specific example of the machine learning method is described later.

In the at least one embodiment, all of the viewer comments are temporarily displayed on the window W. A viewer comment estimated as inappropriate by the learning models is notified to the operator terminal 20. The operator checks whether or not the viewer comment is actually inappropriate. When the operator determines that the viewer comment is inappropriate, the operator operates the operation unit 24 of the operator terminal 20 to delete this viewer comment. Thus, the viewer comment estimated as inappropriate by the learning models is being displayed on the window W until this viewer comment is deleted by the operator.

In the at least one embodiment, in order to increase an estimation accuracy of inappropriate viewer comments, a plurality of learning models such as a first model and a second model are used. However, when the estimation based on both of the first model and the second model is executed for all of the viewer comments, a processing load on the server 10 becomes higher. For example, when the processing load on the server 10 becomes higher, delay may occur in the moving image distributed in the live distribution service, or the detection of inappropriate viewer comments may take time.

Thus, when the estimation accuracy of the first model is high, the estimation result of the first model is reliable, and hence the live distribution system 1 according to the at least one embodiment avoids the execution of the estimation based on the second model. When the estimation accuracy of the first model is low, the estimation result of the first model is not very reliable, and hence the live distribution system 1 executes the estimation based on the second model. As a result, the processing load on the server 10 is reduced. Description is now given of details of the at least one embodiment.

3. Functions Implemented in Live Distribution System

Figure 3:
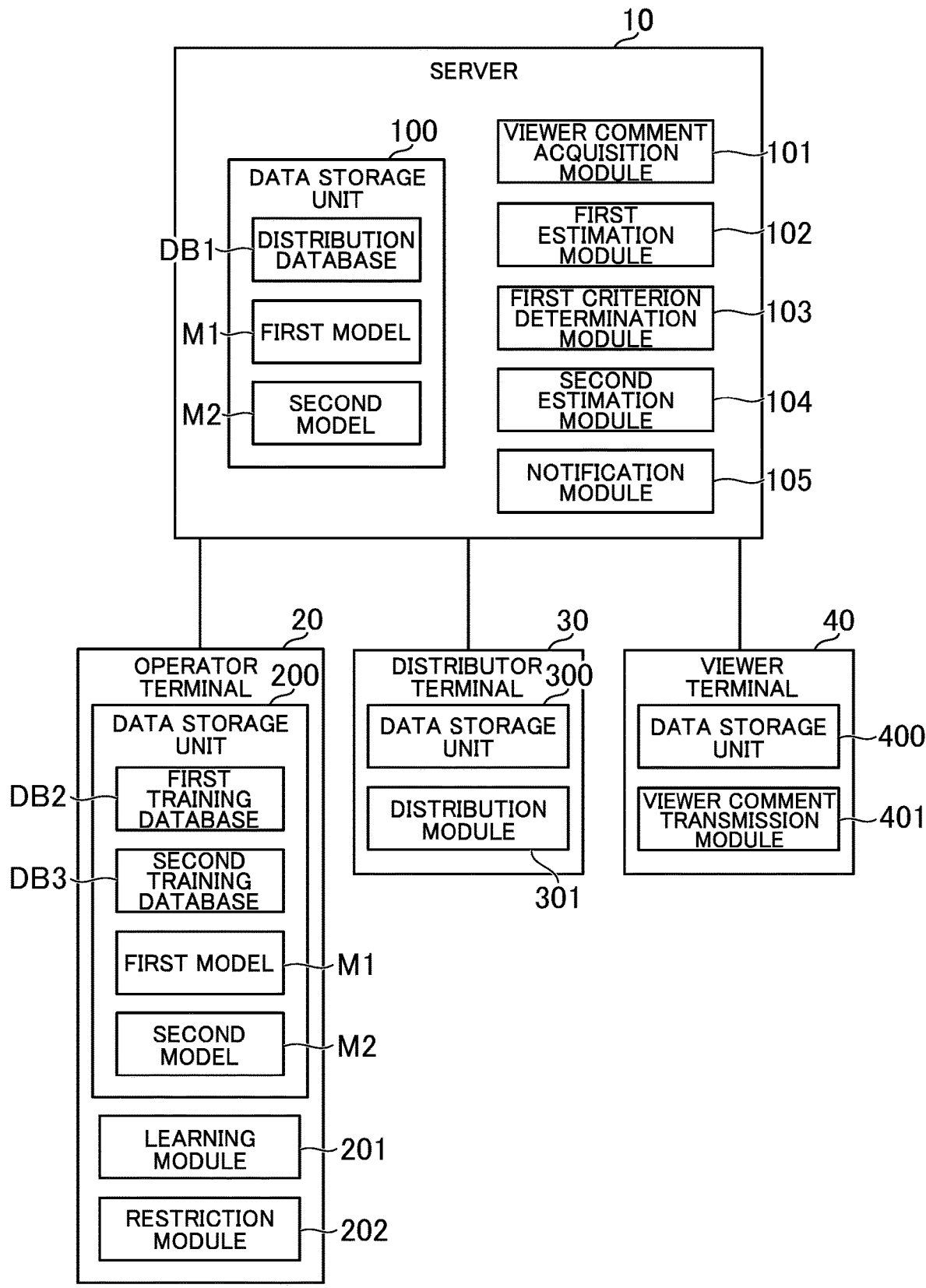
FIG. 3 is a diagram for illustrating an example of functions implemented in the live distribution system.

FIG. 3 is a diagram for illustrating an example of functions implemented in the live distribution system 1.

3-1. Functions Implemented in Server

For example, the server 10 includes a data storage unit 100, a viewer comment acquisition module 101, a first estimation module 102, a first criterion determination module 103, a second estimation module 104, and a notification module 105. The data storage unit 100 is implemented by the storage unit 12. Each of the viewer comment acquisition module 101, the first estimation module 102, the first criterion determination module 103, the second estimation module 104, and the notification module 105 is implemented by the control unit 11.
[Data Storage Unit]

The data storage unit 100 stores data required in order to provide the live distribution service. For example, the data storage unit 100 stores a distribution database DB1.

FIG. 4 is a table for showing an example of the distribution database DB1. The distribution database DB1 is a database which stores data on moving images being distributed in the live distribution service. For example, in the distribution database DB1, moving image IDs, distributor IDs, titles of the moving images, actual data on the moving images, actual data on the viewer comments, viewer IDs, dates and times of posts, and estimation results. Not only the moving images being distributed, but an archive of moving images distributed in the past may be stored in the distribution database DB1.

The moving image ID is information capable of uniquely identifying a moving image. When the distribution of a moving image is started in the live distribution service, the server 10 issues a new moving image ID such that the new moving image ID is not identical to the other moving image IDs, and creates a new record in the distribution database DB1. The distributor ID is information capable of uniquely identifying a distributor of the moving image. The title of the moving image is a name of the moving image input by the distributor. The actual data on the moving image may have any format, and may have, for example, the MPEG format, the MP4 format, the MOV format, or the AVI format.

The actual data on the viewer comment may have any format, and may have, for example, the text format, the Rich Text Format, or the message format. The viewer ID is information capable of uniquely identifying a viewer who has input the viewer comment. The date and time of post is a date and time of post of the viewer comment. The estimation result is the estimation result of at least one of the first model M1 or the second model M2. The actual data on the viewer comment, the viewer ID, the date and time of post, and the estimation result are stored in the distribution database DB1 each time the viewer inputs the viewer comment.

For example, the data storage unit 100 stores the trained first model M1 and the trained second model M2. "Trained" means completion of adjustment of parameters. The data storage unit 100 stores a program and the parameters of each of the first model M1 and the second model M2. In the at least one embodiment, description is given of a case in which the training of each of the first model M1 and the second model M2 is executed by the operator terminal 20, but the training of each of the first model M1 and the second model M2 may be executed by another computer other than the operator terminal 20. The first model M1 and the second model M2 may be combined as one piece of data. That is, the first model M1 and the second model M2 may be included in one model.

Figure 5:
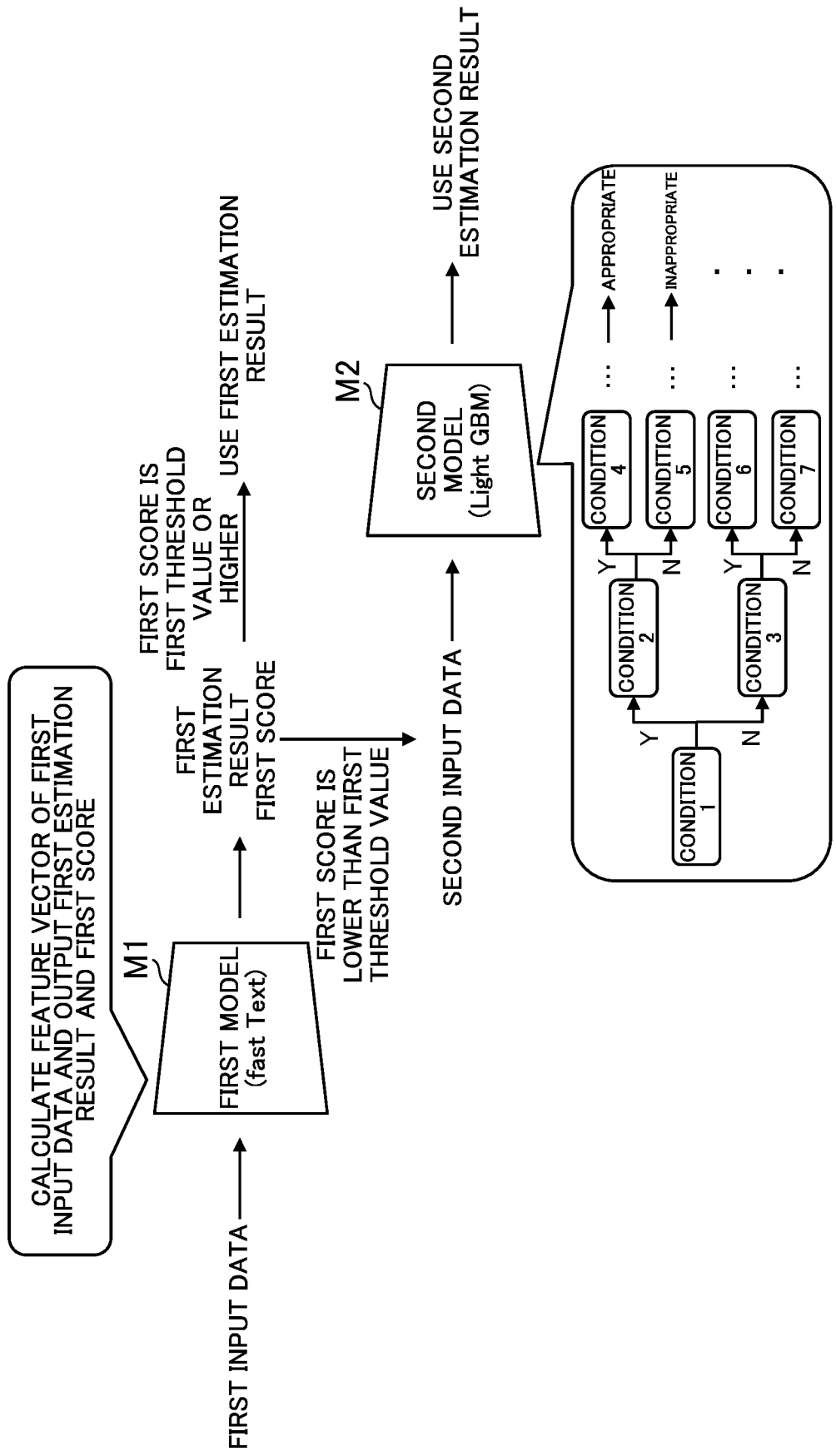
FIG. 5 is a diagram for illustrating an example of processing for estimating whether or not a viewer comment is appropriate based on a first model and a second model.

FIG. 5 is a diagram for illustrating an example of processing for estimating whether or not the viewer comment is appropriate based on the first model M1 and the second model M2. Data input to the first model M1 is hereinafter referred to as "first input data." The estimation result of the first model is hereinafter referred to as "first estimation result." Data input to the second model M2 is hereinafter referred to as "second input data." The estimation result of the second model is hereinafter referred to as "second estimation result." The first input data, the second input data, the first estimation result, and the second estimation result may have any formats.

For example, the first model M1 is a model which uses the fastText. The fastText is a model which converts a meaning of a word into a feature vector based on text data such as an Internet encyclopedia. The fastText can calculate the feature vector of the word faster than other models such as the Word2Vec. For example, the viewer comment itself is input to the first model M1 as the first input data. The first model M1 applies morphological analysis to the first input data, to thereby calculate the feature vector for each word.

For example, the first model M1 calculates a feature vector of the entire first input data based on the feature vector of each word. The first model M1 outputs a first estimation result and a first score corresponding to the feature vector of the entire first input data. The morphological analysis may be executed outside the first model M1, and the first input data may be a sequence of words obtained after the viewer comment is decomposed into words. Moreover, the feature vector of each of the words may be calculated outside the first model M1, and the first input data may be a sequence of the feature vectors.

In the at least one embodiment, the first model M1 outputs binary data indicating whether or not the viewer comment is appropriate as the first estimation result. It is only required that the first estimation result be data on whether or not the viewer comment is appropriate, and is not limited to the example of the at least one embodiment. For example, the first estimation result is not required to be the binary data, and intermediate values may exist. For example, when whether or not the viewer comment is appropriate is classified into five levels, the first estimation result may be expressed as the five levels. The first model M1 classifies whether or not the viewer comment is appropriate, and hence the first estimation result can be considered as a classification result regarding the classification of whether or not the viewer comment is appropriate.

The first score is a score relating to the estimation accuracy of the first model M1. The first score is an index indicating a degree of confidence of the first model M1 in the estimation. The first score may be considered as a reliability of the first estimation result. In the at least one embodiment, description is given of a case in which an index referred to as "confidence score" calculated for each piece of first input data corresponds to the first score. As a method itself of calculating the confidence score, publicly known various methods can be used. For example, the first score may be calculated through use of the log loss (cross entropy), the area under the curve (AUC), or the Gini coefficient. In the at least one embodiment, description is given of a case in which the first score is represented by a numerical value of from 0 to 100, but the first score can be expressed in any range of numerical values.

The first score is not required to be the confidence score, and may be another index. For example, the first score may be a cosine similarity between the feature vector of the viewer comment and a feature vector of first training comments described later. In this case, as the cosine similarity becomes higher, the viewer comment is more similar to the first training comments that have been learned, and hence the accuracy of the estimation result becomes higher. The first score may be an index such as the F-measure, the accuracy, or the precision.

In the at least one embodiment, the second model M2 is a model including conditional branches. For example, the second model M2 is a model using the light gradient boosting machine (LightGBM). The LightGBM is a model using the gradient boosting algorithm for the decision tree. The LightGBM includes a plurality of decision trees. The LightGBM determines whether or not a condition represented by each of the plurality of conditional branches is satisfied based on the data input to the LightGBM itself, and outputs an estimation result corresponding to a result of the determination. It is known that the LightGBM has a higher speed and a higher accuracy than those of the XGBoost, which is a type of the gradient boosting algorithm for the decision tree, but it is assumed in the at least one embodiment that the LightGBM is slower than the fastText.

In the example of FIG. 5, the second model M2 includes the plurality of conditional branches which correspond to a condition 1 to a condition 7. For example, as the second input data, a plurality of items relating to features of the viewer comment are input to the second model M2. Each item is only required to be an item relating to a certain feature of the viewer comment, and may be the number of characters of the viewer comment, the number of words included in the viewer comment, or a feature vector of the entire viewer comment. As in modification examples of the present disclosure described later, the second input data may include other items such as a result of comparison with a keyword. The condition in the decision tree is only required to be a condition that can be used for determination in accordance with the item included in the second input data. For example, a threshold value for each of the number of characters, the number of words, or the feature vector of the viewer comment may be set as the condition.

For example, each of the plurality of conditional branches included in the second model M2 includes a condition to be used for determination based on at least one item included in the second input data. In the example of FIG. 5, the second model M2 determines whether or not the condition 1 is satisfied based on the second input data. When the second model M2 determines that the condition 1 is satisfied, the second model M2 determines whether or not the condition 2 is satisfied based on the second input data. When the second model M2 determines that the condition 1 is not satisfied, the second model M2 determines whether or not the condition 3 is satisfied based on the second input data. Thereafter, the second model M2 similarly determines whether or not the condition of the conditional branch having the tree form is satisfied until a leaf of the decision tree is reached. The second estimation result is associated with the leaf of the decision tree. The second model M2 outputs the second estimation result at the leaf of the decision tree.

In the at least one embodiment, the second model M2 outputs, as the second estimation result, binary data indicating whether or not the viewer comment is appropriate. It is only required that the second estimation result be data on whether or not the viewer comment is appropriate, and is not limited to the example of the at least one embodiment. For example, the second estimation result is not required to be the binary data, and intermediate values may exist. For example, when whether or not the viewer comment is appropriate is classified into five levels, the second estimation result may be expressed as the five levels. The first estimation result and the second estimation result may be different from each other in the number of levels. The second model M2 classifies whether or not the viewer comment is appropriate, and hence the second estimation result can be considered as a classification result regarding the classification of whether or not the viewer comment is appropriate.

In the at least one embodiment, it is assumed that the first model M1 is a faster model than the second model M2. The first model M1 can also be considered as a model smaller in calculation amount than the second model M2. For example, it is assumed that certain "n" ("n" is a natural number) viewer comments are to be estimated by each of the first model M1 and the second model M2. The "n" viewer comments estimated by the first model M1 and the "n" viewer comments estimated by the second model M2 are the same as each other. A first time required for the first model M1 to output all of the "n" first estimation results is shorter than a second time required for the second model M2 to output all of the "n" second estimation results.

In the at least one embodiment, it is assumed that the second model M2 is higher in accuracy than the first model M1. For example, it is assumed that "n" viewer comments for which ground truths are known in advance are input to each of the first model M1 and the second model M2. The "n" viewer comments estimated by the first model M1 and the "n" viewer comments estimated by the second model M2 are the same as each other. In this case, the accuracy of the second model M2 is higher than the accuracy of the first model M1. It is assumed that the second model M2 is also higher than the first model M1 in not only the accuracy, but also another index such as the precision and the F-measure.

The first model M1 and the second model M2 may be models using machine learning methods other than the fastText and the LightGBM, and are not limited to the example of the at least one embodiment. The first model M1 and the second model M2 may be any combination. For example, the first model M1 may be a model using the Word2Vec, the XGBoost, the BERT, the Transformer other than the BERT, a neural network, a long-short term memory, or a support vector machine. The second model M2 may be a model using a machine learning method that is different from that of the first model M1 among those exemplified machine learning methods. The first model M1 and the second model M2 may be models using the same machine learning method, but may be models which have learned pieces of training data different from each other.

Moreover, the first model M1 may be lower in speed than the second model M2. The first model M1 may be higher in accuracy than the second model M2. For example, the first model M1 may be a model using the LightGBM, and the second model M2 is a model using the fastText, which is opposite to the example of the at least one embodiment. It is only required that the machine learning method of the first model M1 and the machine learning method of the second model M2 be different from each other.

[Viewer Comment Acquisition Module]

The viewer comment acquisition module 101 acquires the viewer comment input by the viewer of the live distribution service. The acquisition of the viewer comment is acquisition of actual data on the viewer comment. In the at least one embodiment, the viewer comment acquisition module 101 is implemented by the server 10, and hence the viewer comment acquisition module 101 acquires the viewer comment transmitted by the viewer comment transmission module 401 of the viewer terminal 40. The viewer comment acquisition module 101 stores, in the distribution database DB1, the actual data on a viewer comment input for a certain moving image in association with the moving image ID of this moving image together with the viewer ID of a viewer who has input the viewer comment and the date and time of post.

[First Estimation Module]

The first estimation module 102 estimates whether or not the viewer comment is appropriate based on the first model M1 which has learned the first training comments. The first training comments are comments for training to be learned by the first model M1. The first training comments are stored in a first training database DB2 described later. For example, the first estimation module 102 inputs the viewer comment into the first model M1 as the first input data. The first model M1 calculates a feature vector of the entire viewer comment based on the first input data, and outputs an estimation result corresponding to this feature vector. The first estimation module 102 acquires the estimation result of the first model M1, to thereby estimate whether or not the viewer comment is appropriate.

[First Criterion Determination Module]

The first criterion determination module 103 determines whether or not the first score satisfies a predetermined first criterion. In the at least one embodiment, description is given of a case in which the first score is calculated by the first model M1, and the first criterion determination module 103 acquires the first score output from the first model M1, but the first score may be calculated by inputting data representing internal processing of the first model M1 into an algorithm for calculating the first score. Moreover, in the at least one embodiment, description is given of a case in which a higher first score means a higher estimation accuracy of the first model M1, but it is only required that there exist a correlation between the first score and the estimation accuracy of the first model M1, and a lower first score may mean a higher estimation accuracy of the first model M1.

The first criterion is a criterion for determining whether or not the estimation based on the second model M2 is to be executed. In the at least one embodiment, a higher first score means a higher estimation accuracy of the first model M1, and hence a state in which the first score is equal to or higher than a first threshold value corresponds to the state in which the first criterion is satisfied. The first threshold value may be a variable value which can be specified by the operator or a fixed value determined in advance. When a lower first score means a higher estimation accuracy of the first model M1, it is only required that a state in which the first score is lower than the first threshold value correspond to the state in which the first criterion is satisfied.

For example, the first criterion determination module 103 determines whether or not the first score is equal to or higher than the first threshold value, to thereby determine whether or not the first score satisfies the first criterion. The first criterion determination module 103 determines that the first score satisfies the first criterion when the first score is equal to or higher than the first threshold value. The first criterion determination module 103 determines that the first score does not satisfy the first criterion when the first score is lower than the first threshold value.

[Second Estimation Module]

The second estimation module 104 avoids the estimation based on the second model M2 which has learned the second training comments when the first score is determined to satisfy the first criterion. The second estimation module 104 estimates whether or not the viewer comment is appropriate based on the second model M2 when the first score is determined not to satisfy the first criterion. As illustrated in FIG. 5, the second estimation module 104 avoids the input of the second input data based on the viewer comment into the second model M2 when the first score is determined to satisfy the first criterion. The second estimation module 104 inputs the second input data into the second model M2 when the first score is determined not to satisfy the first criterion.

In the at least one embodiment, the second model M2 includes the conditional branches, and hence the second estimation module 104 acquires the output corresponding to the conditional branches satisfied by the viewer comment when the first score is determined not to satisfy the first criterion, to thereby estimate whether or not the viewer comment is appropriate. For example, the second model M2 generates the second input data including the plurality of items relating to the features of the viewer comment, determines whether or not each of the conditions of the plurality of conditional branches is satisfied based on the second input data, and outputs the second estimation result corresponding to a result of the determination. The second estimation module 104 acquires the second estimation result of the second model M2, to thereby estimate whether or not the viewer comment is appropriate.

[Notification Module]

The notification module 105 notifies the operator terminal 20 of the estimation result of at least one of the first model M1 or the second model M2. For example, the notification module 105 notifies the operator terminal 20 of a viewer comment estimated as inappropriate by the first model M1. The notification module 105 notifies the operator terminal 20 of a viewer comment estimated as inappropriate by the second model M2. The notification module 105 is not required to notify the operator terminal 20 of a viewer comment which is estimated as inappropriate by the first model M1, but is estimated as appropriate by the second model M2. The notification module 105 may notify the operator terminal 20 of a viewer comment which is estimated as appropriate by the first model M1, but is estimated as inappropriate by the second model M2.

It is only required for the server 10 to execute predetermined processing based on at least one of the first estimation result or the second estimation result. The predetermined processing is not limited to the notification by the notification module 105. For example, processing by the display control module 110 in Modification Example 10 described later is also an example of the predetermined processing. The predetermined processing may be processing other than the processing by the notification module 105 or the display control module 110, and may be, for example, processing of postponing display of the poster comment for a certain period, processing of lowering a display order of the poster comment, or processing of displaying the poster comment in a small size.

For example, the server 10 executes the predetermined processing based on the first estimation result when the first score is determined to satisfy the first criterion. The server 10 executes the predetermined processing based on not the first estimation result, but the second estimation result when the first score is determined not to satisfy the first criterion. The server 10 may execute the predetermined processing based on both of the first estimation result and the second estimation result when the first score is determined not to satisfy the first criterion.

3-2. Functions Implemented in Operator Terminal

For example, the operator terminal 20 includes a data storage unit 200, a learning module 201, and a restriction module 202. The data storage unit 200 is implemented by the storage unit 22. The learning module 201 and the restriction module 202 are implemented by the control unit 21.

[Data Storage Unit]

The data storage unit 200 stores data required for the operation of the live distribution service. For example, the data storage unit 200 stores the first model M1 and the second learning model M2 before being trained. The first model M1 and the second model M2 before being trained are models in which the parameters have initial values. The first model M1 and the second model M2 before being trained are trained by the learning module 201. For example, the data storage unit 200 stores the first training database DB2 and a second training database DB3.

The first training database DB2 is a database which stores a plurality of pieces of the first training data. The first training data is training data to be learned by the first model M1. The first training data represents relationships each between the first training comment (input portion) and the ground truth (output portion) indicating whether or not this first training comment is appropriate. The input portion of the first training data has the same format as that of the first input data. The output portion of the first training data has the same format as that of the first estimation result. The first training comment may be a poster comment input in the live distribution service in the past, or may be a virtual comment prepared by the operator for the training. It is assumed that the ground truth is manually labeled by the operator, but a tool for automatically executing the labeling may be used.

The second training database DB3 is a database which stores a plurality of pieces of the second training data. The second training data is training data to be learned by the second model M2. The second training data includes the second training comment (input portion) and the ground truth (output portion) indicating whether or not this second training comment is appropriate. The input portion of the second training data has the same format as that of the second input data. The output portion of the second training data has the same format as that of the second estimation result. The second training comment may be a poster comment input in the live distribution service in the past, or may be a virtual comment prepared by the operator for the training. It is assumed that the ground truth is manually labeled by the operator, but a tool for automatically executing the labeling may be used.

[Learning Module]

The learning module 201 trains the first model M1 and the second model M2. For example, when a first training comment included in certain first training data is input, the learning module 201 adjusts the parameters of the first model M1 so that a ground truth included in this first training data is output. When a second training comment included in certain second training data is input, the learning module 201 adjusts the parameters of the second model M2 so that a ground truth included in this second training data is output.

As the learning methods themselves of the first model M1 and the second model M2, it is only required that methods used in the machine learning methods be used. In the example of the at least one embodiment, the learning module 201 trains the first model M1 based on a learning method used in the FastText. The learning module 201 trains the second model M2 based on a learning method used in the LightGBM. For example, methods such as the backpropagation or the gradient descent may be used depending on the machine learning methods used for the first model M1 and the second model M2 to train the first model M1 and the second model M2.

[Restriction Module]

The restriction module 202 restricts the display of the poster comment determined as inappropriate by at least one of the first model M1 or the second model M2. In the at least one embodiment, the restriction module 202 restricts the display of poster comments that are specified by the operator among poster comments notified to the operator terminal 20. For example, the restriction module 202 deletes poster comments determined as inappropriate by the operator from the distribution database DB1. Instead of deleting the poster comments, the restriction module 202 may set a flag meaning that the display is restricted to ON, to thereby restrict the display of the poster comments. In this case, it is assumed that this flag is stored in the distribution database DB1. The poster comment having the flag set to ON is not displayed on the window W.

3-3. Functions Implemented in Distributor Terminal

For example, the distributor terminal 30 includes a data storage unit 300 and a distribution module 301. The data storage unit 300 is implemented by the storage unit 32. The distribution module 301 is implemented by the control unit 31.

[Data Storage Unit]

The data storage unit 300 stores data required for the distributor to use the live distribution service. For example, the data storage unit 300 stores a browser used by the distributor to distribute the moving image or an application dedicated to the live distribution service.

[Distribution Module]

The distribution module 301 transmits the moving image generated by the camera 36 to the viewers. For example, the distribution module 301 transmits the moving image to the server 10.

3-4. Functions Implemented in Viewer Terminal

For example, the viewer terminal 40 includes a data storage unit 400 and a viewer comment transmission module 401. The data storage unit 400 is implemented by the storage unit 42. The viewer comment transmission module 401 is implemented by the control unit 41.

[Data Storage Unit]

The data storage unit 400 stores data required for the viewer to use the live distribution service. For example, the data storage unit 400 stores a browser used by the viewer to view the moving image or an application dedicated to the live distribution service.

[Viewer Comment Transmission Module]

The viewer comment transmission module 401 transmits the viewer comment to the server 10.

4. Processing Executed in Live Distribution System

Figure 6:
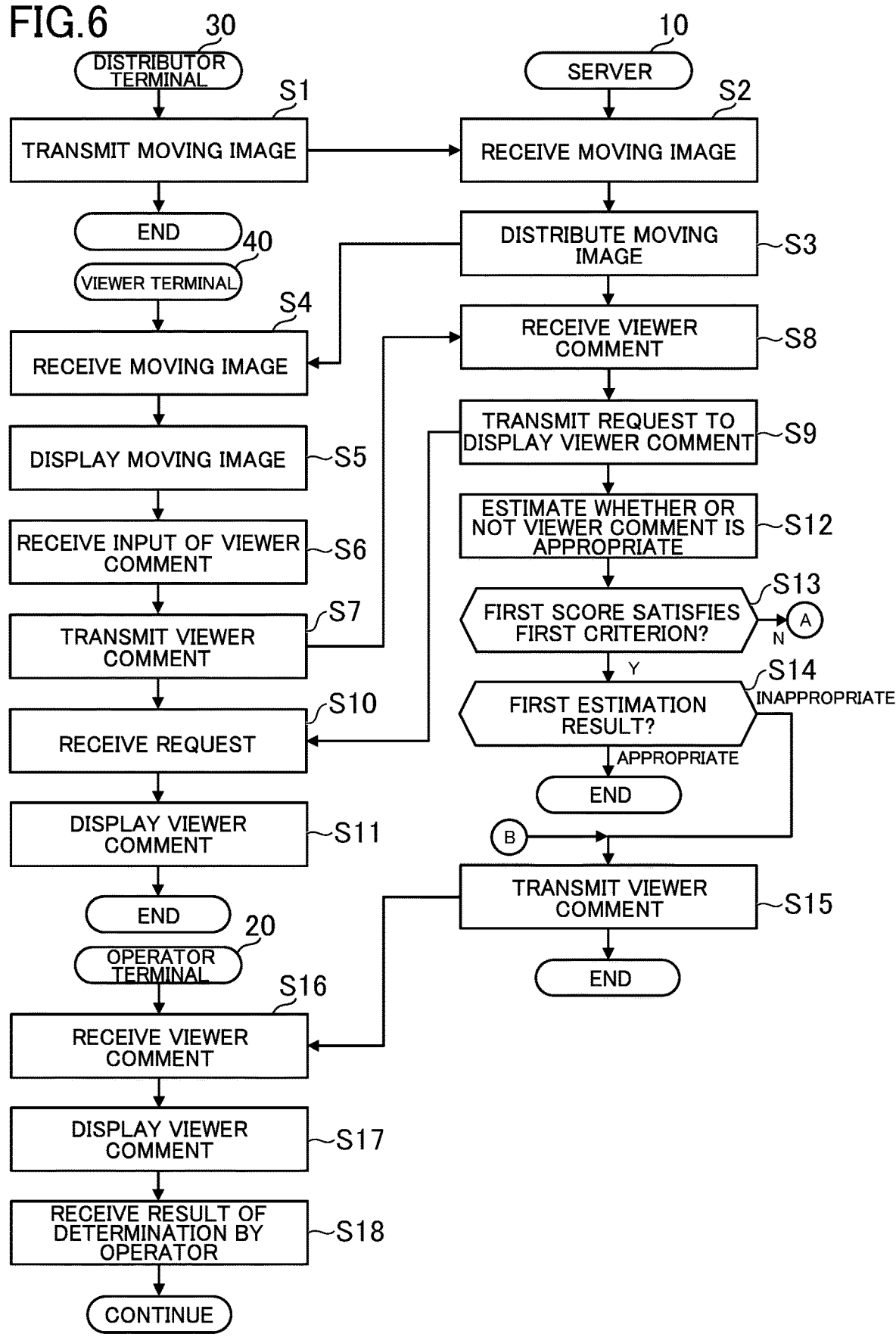
FIG. 6 is a flowchart for illustrating an example of processing executed by the live distribution system.
Figure 7:
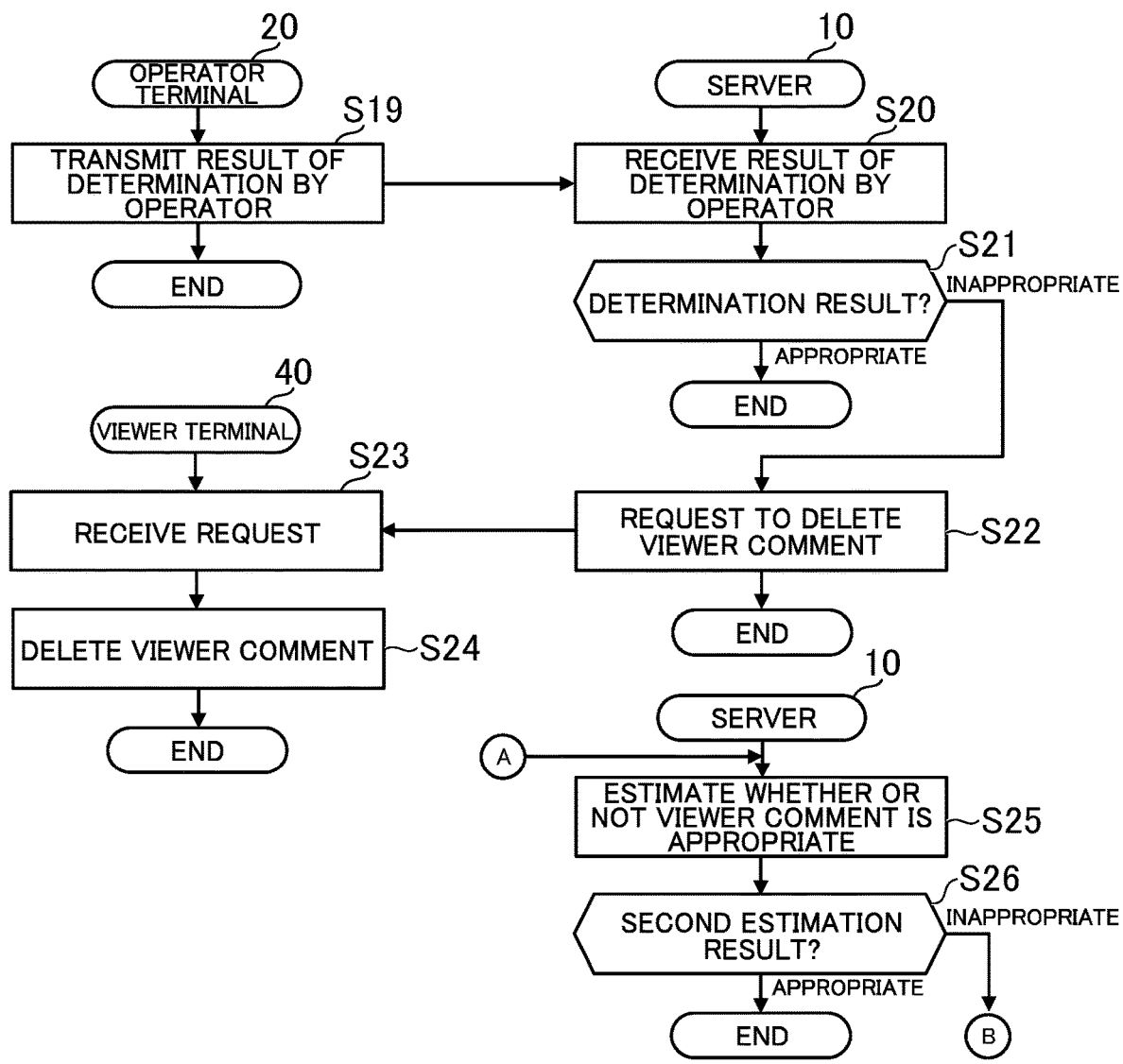
FIG. 7 is a flowchart for illustrating the example of the processing executed by the live distribution system.

FIG. 6 and FIG. 7 are flowcharts for illustrating an example of processing executed by the live distribution system 1. The processing of FIG. 6 and FIG. 7 is executed by the control units 11, 21, 31, and 41 operating in accordance with programs stored in the storage units 12, 22, 32, and 42, respectively. In FIG. 6 and FIG. 7, there is illustrated a flow in which the viewer comment is input for the moving image distributed in the live distribution service.

As illustrated in FIG. 6, the distributor terminal 30 transmits the moving image generated by the camera 36 to the server 10 (Step S1). When the server 10 receives the moving image from the distributor terminal 30 (Step S2), the server 10 distributes the moving image to the viewer terminal 40 (Step S3). When the viewer terminal 40 receives the moving image (Step S4), the viewer terminal 40 displays the moving image on the display unit 45 (Step S5). The viewer terminal 40 receives input of the viewer comment into the input form F (Step S6), and transmits the viewer comment to the server 10 (Step S7).

When the server 10 receives the viewer comment from the viewer terminal 40 (Step S8), the server 10 stores the viewer comment in the distribution database DB1, and transmits, to the viewer terminal 40, a request to display the viewer comment on the window W (Step S9). In the at least one embodiment, description is given of a case in which the estimation which uses the first model M1 is executed after the viewer comment is displayed, but the viewer comment may be displayed after the estimation which uses the first model M1 or the second model M2 is executed. When the viewer terminal 40 receives the request from the server 10 (Step S10), the viewer terminal 40 displays the viewer comment on the window W (Step S11).

The server 10 estimates whether or not the viewer comment is appropriate based on the first model M1 (Step S12). In Step S12, the server 10 inputs the first input data into the first model M1, and acquires the first estimation result and the first score output from the first model M1. The first estimation result is stored in the distribution database DB1. The server 10 determines whether or not the first score satisfies the first criterion (Step S13). When it is determined that the first score satisfies the first criterion (Y in Step S13), the server 10 refers to the first estimation result (Step S14). When the estimation result of the first model M1 indicates that the viewer comment is appropriate ("appropriate" in Step S14), this processing is finished. In this case, the viewer comment remains displayed on the window W.

When the estimation result of the first model M1 indicates that the viewer comment is inappropriate in Step S14 ("inappropriate" in Step S14), the server 10 transmits the viewer comment to the operator terminal 20 (Step S15). When the operator terminal 20 receives the viewer comment (Step S16), the operator terminal 20 displays the viewer comment on the display unit 25 (Step S17). The operator checks the viewer comment displayed on the display unit 25. The operator terminal 20 receives the result of determination by the operator from the operation unit 24 (Step S18).

With reference to FIG. 7, the operator terminal 20 transmits the result of determination by the operator to the server 10 (Step S19). When the server 10 receives the result of determination by the operator (Step S20), the server 10 refers to this determination result (Step S21). When the result of determination by the operator indicates that the viewer comment is appropriate ("appropriate" in Step S21), this processing is finished. In this case, the viewer comment remains displayed on the window W. When the result of determination by the operator indicates that the viewer comment is inappropriate in Step S21 ("inappropriate" in Step S21), the server 10 deletes the viewer comment stored in the distribution database DB1, and requests the viewer terminal 40 to delete the viewer comment from the window W (Step S22). When the viewer terminal 40 receives the request (Step S23), the viewer terminal 40 deletes the viewer comment from the window W (Step S24), and this processing is finished.

When the server 10 determines that the first score does not satisfy the first criterion in Step S13 of FIG. 6 (N in Step S13), the server 10 estimates whether or not the viewer comment is appropriate based on the second model M2 as illustrated in FIG. 7 (Step S25). In Step S25, the server 10 inputs the second input data into the second model M2, and acquires the second estimation result output from the second model M2. The second estimation result is stored in the distribution database DB1. When the estimation result of the second model M2 indicates that the viewer comment is appropriate ("appropriate" in Step S26), this processing is finished. In this case, the viewer comment remains displayed on the window W. When the estimation result of the second model M2 indicates the viewer comment is inappropriate in Step S26 ("inappropriate" in Step S26), the process proceeds to Step S15. The estimation result of the second model M2 is prioritized regardless of the estimation result of the first model M1.

With the live distribution system 1, the estimation based on the second model M2 is avoided when the first score is determined to satisfy the first criterion. Whether or not the viewer comment is appropriate is estimated based on the second model M2 when the first score is determined not to satisfy the first criterion. As a result, the reliability of the estimation result of the first model M1 is high when the first score satisfies the first criterion, and hence the processing load on the server 10 can be reduced by omitting the estimation which uses the second model M2. Further, it is possible to estimate faster whether or not the viewer comment is appropriate by omitting the estimation which uses the second model M2. When the first score does not satisfy the first criterion, the reliability of the estimation result of the first model M1 is low, and it is possible to accurately estimate whether or not the viewer comment is appropriate by executing the estimation which uses the second model M2. For example, it is possible to prevent, by reducing the processing load on the server 10, a loss of real-time nature of the live distribution service such as a delay in the moving image. It is also possible to prevent, by achieving the high-speed estimation, such a state in which an inappropriate viewer comment remains displayed. In the moving image distribution service, various moving images may simultaneously be distributed, and an increase in the number of the moving images being distributed can be handled without causing a problem by reducing the processing load on the server 10.

Moreover, in the live distribution system 1, the first model M1 is a model faster than the second model M2. As a result, the processing load on the server 10 can effectively be reduced by using the faster first model M1 first. Further, it is possible to faster estimate whether or not the viewer comment is appropriate.

Moreover, the live distribution system 1 acquires the output of the second model M2 corresponding to the conditional branches satisfied by the viewer comment when the first score is determined not to satisfy the first criterion, to thereby estimate whether or not the viewer comment is appropriate. As a result, the estimation accuracy regarding the estimation of whether or not the viewer comment is appropriate increases through use of the second model M2 including the conditional branches.

5. Modification Examples

The present disclosure is not limited to the at least one embodiment described above, and can be modified suitably without departing from the spirit of the present disclosure.

Figure 8:
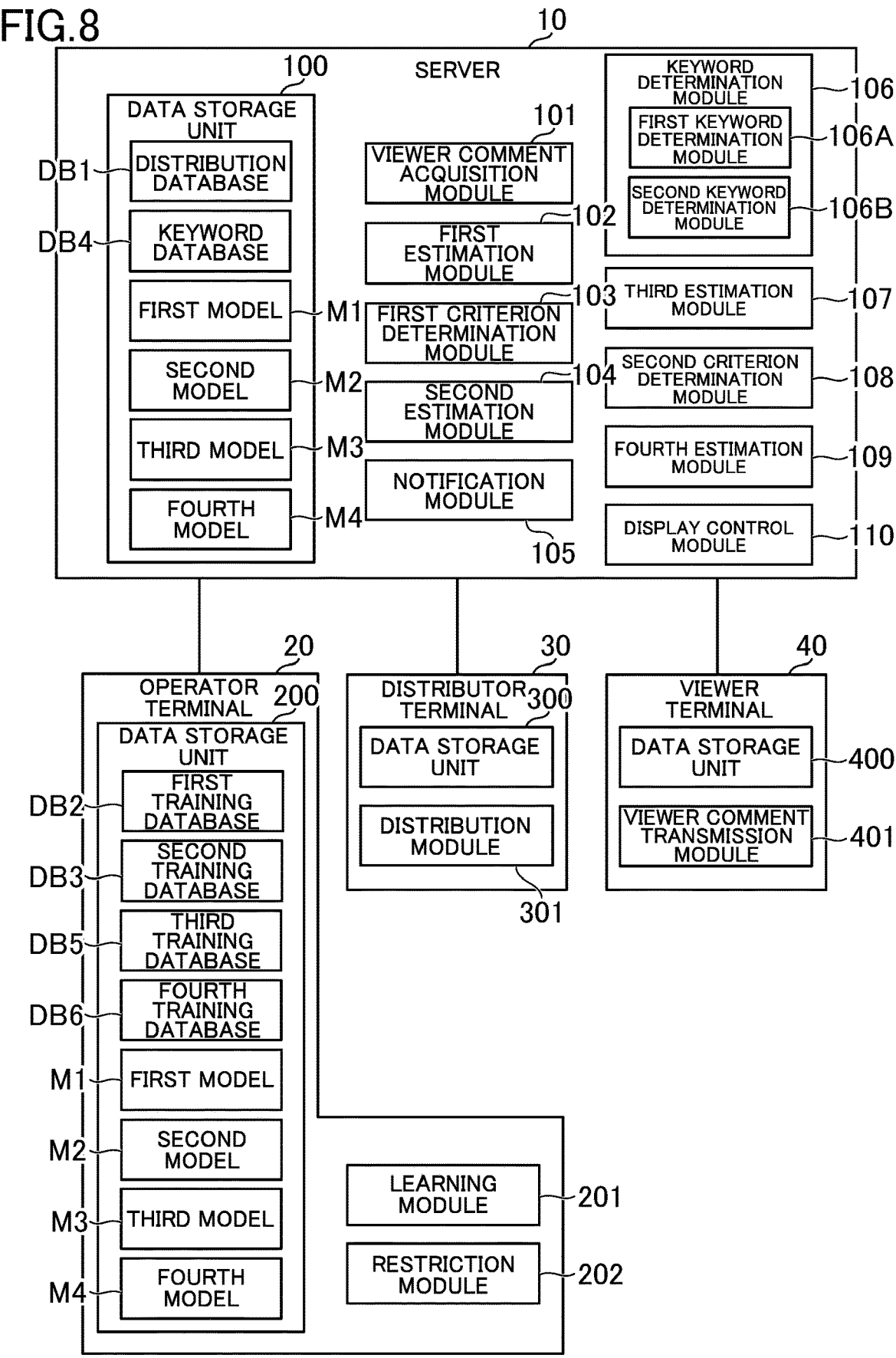
FIG. 8 is a diagram for illustrating an example of functions implemented in modification examples of the present disclosure.

FIG. 8 is a diagram for illustrating an example of functions implemented in the modification examples. As illustrated in FIG. 8, in the modification examples described below, the server 10 includes a keyword determination module 106, a third estimation module 107, a second criterion determination module 108, a fourth estimation module 109, and a display control module 110. Those functions are implemented by the control unit 11.

Modification Example 1

For example, the second input data input to the second model M2 is not limited to the example of the at least one embodiment. The second input data may include the first estimation result. In Modification Example 1, binary data representing whether or not the viewer comment is appropriate is exemplified as the first estimation result as in the at least one embodiment, but the intermediate values may exist in the estimation result. At least one conditional branch of the second model M2 has a condition relating to the first estimation result. Whether or not the condition of the at least one conditional branch is satisfied changes in accordance with the first estimation result.

Figure 9:
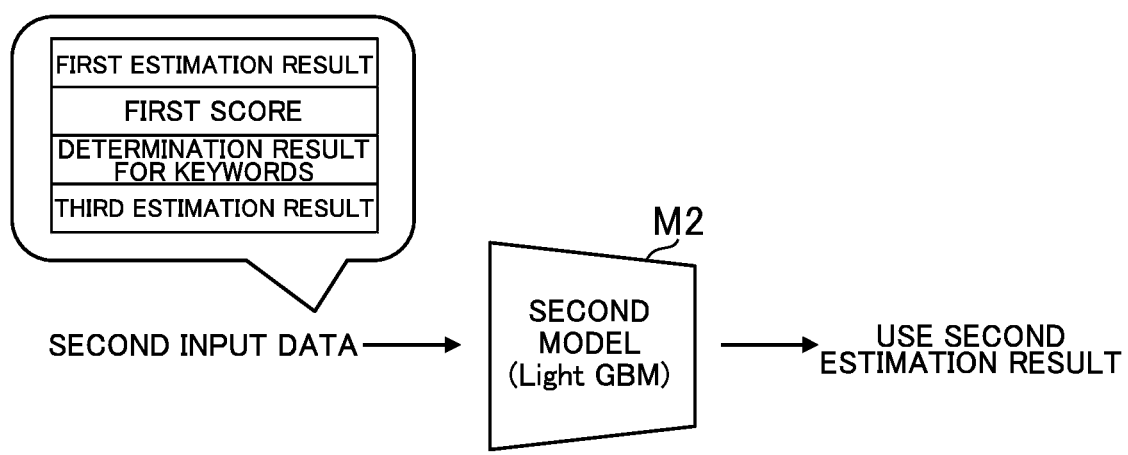
FIG. 9 is a diagram for illustrating an example of processing executed by the second model.

FIG. 9 is a diagram for illustrating an example of the processing of the second model M2. In FIG. 9, pieces of processing of the second model M2 in Modification Example 1 to Modification Example 6 are together illustrated. The second input data is not required to include all items described in Modification Example 1 to Modification Example 6, and may include only a part of the items. The second model M2 in Modification Example 1 has learned the second training data indicating a relationship between the first estimation result of a certain second training comment and a ground truth indicating whether or not this second training comment is appropriate. The first estimation result of the second training comment may be acquired by inputting the first input data corresponding to the second training comment to the trained first model M1 or may be specified by the operator. The content included in the second training data is different from that in the at least one embodiment, but the learning method itself is similar to that in the at least one embodiment.

The second estimation module 104 in Modification Example 1 estimates, when the first score is determined not to satisfy the first criterion, whether or not the viewer comment is appropriate based on the first estimation result and the second model M2. For example, the second estimation module 104 inputs the second input data including the first estimation result into the second model M2. The second model M2 determines whether or not the second input data satisfies each of the conditions of the plurality of conditional branches. The second model M2 outputs the second estimation result corresponding to the conditions satisfied by the second input data. The second estimation module 104 acquires the second estimation result output from the second model M2, to thereby estimate whether or not the viewer comment is appropriate.

The live distribution system 1 according to Modification Example 1 estimates, when the first score is determined not to satisfy the first criterion, whether or not the viewer comment is appropriate based on the first estimation result and the second model M2. Even when the first score does not satisfy the first criterion, the first estimation result is sometimes useful as a reference to a certain degree, and hence the estimation accuracy of the second model M2 increases.

Modification Example 2

For example, as illustrated in FIG. 9, the second input data may include the first score. The second model M2 in Modification Example 2 has learned the second training data indicating a relationship between the first score of a certain second training comment and a ground truth indicating whether or not this second training comment is appropriate. The first score of the second training comment may be acquired by inputting the first input data corresponding to the second training comment to the trained first model M1 or may be specified by the operator. The content included in the second training data is different from that in the at least one embodiment, but the learning method itself is similar to that in the at least one embodiment.

The second estimation module 104 in Modification Example 2 estimates, when the first score is determined not to satisfy the first criterion, whether or not the viewer comment is appropriate based on the first score and the second model M2. For example, the second estimation module 104 inputs the second input data including the first score into the second model M2. The second model M2 determines whether or not the second input data satisfies each of the conditions of the plurality of conditional branches. The second model M2 outputs the second estimation result corresponding to the conditions satisfied by the second input data. The second estimation module 104 acquires the second estimation result output from the second model M2, to thereby estimate whether or not the viewer comment is appropriate.

The live distribution system 1 according to Modification Example 2 estimates, when the first score does not satisfy the first criterion, whether or not the viewer comment is appropriate based on the first score and the second model M2. Even when the first score does not satisfy the first criterion, there sometimes exists a correlation between the first score and whether or not the poster comment is appropriate, and hence the estimation accuracy of the second model M2 increases.

Modification Example 3

For example, as illustrated in FIG. 9, the second input data may include a determination result regarding the determination of whether or not the second input data includes keywords. The data storage unit 100 in Modification Example 3 stores a keyword database DB4. For example, at least one of appropriate keywords or inappropriate keywords are stored in the keyword database DB4. In Modification Example 3, description is given of a case in which both of the appropriate keywords and the inappropriate keywords are stored in the keyword database DB4, but only one of the appropriate keywords or the inappropriate keywords may be stored in the keyword database DB4. It is assumed that the keywords stored in the keyword database DB4 are specified by the operator.

The live distribution system 1 according to Modification Example 3 includes the keyword determination module 106. The keyword determination module 106 determines whether or not predetermined keywords are included the viewer comment. For example, the keyword determination module 106 determines whether or not the viewer comment includes each of the plurality of keywords stored in the keyword database DB4. In Modification Example 3, description is given of a case in which the keyword determination module 106 determines exact match with the keywords, but the keyword determination module 106 may determine partial match or fuzzy match (fuzzy search) with the keywords.

The second model M2 in Modification Example 3 has learned the second training data indicating a relationship between a determination result regarding the determination of whether or not a certain second training comment includes keywords and a ground truth indicating whether or not this second training comment is appropriate. The determination result is at least one of the number of keywords, the lengths of keywords, or types of keywords. When appropriateness is associated with each keyword, the determination result may be appropriateness of the keyword. The content included in the second training data is different from that in the at least one embodiment, but the learning method itself is similar to that in the at least one embodiment.

The second estimation module 104 in Modification Example 3 estimates, when the first score is determined not to satisfy the first criterion, whether or not the viewer comment is appropriate based on the determination result regarding the determination of whether or not the viewer comment includes the keywords and on the second model M2. The meaning of the determination result is similar to that of the determination result in the second training comment. For example, the second estimation module 104 inputs the second input data including the determination result regarding the determination of whether or not the keywords are included into the second model M2. The second model M2 determines whether or not the second input data satisfies each of the conditions of the plurality of conditional branches. The second model M2 outputs the second estimation result corresponding to the conditions satisfied by the second input data. The second estimation module 104 acquires the second estimation result output from the second model M2, to thereby estimate whether or not the viewer comment is appropriate.

The live distribution system 1 according to Modification Example 3 estimates, when the first score is determined not to satisfy the first criterion, whether or not the viewer comment is appropriate based on the determination result regarding the determination of whether or not the viewer comment includes the keywords and on the second model M2. As a result, the estimation accuracy of the second model M2 increases.

Modification Example 4

For example, when the keywords are used as in Modification Example 3, a degree of inappropriateness may vary in accordance with the keyword. Thus, a keyword group of black words, which are most inappropriate, and a keyword group of gray words, which are inappropriate to a certain degree, may selectively be used. In the keyword database DB4 in Modification Example 4, the keyword group of the black words and the keyword group of the gray words are stored. It is assumed that information indicating whether a keyword is the black word or the gray word is stored in advance in the keyword database DB4. The keyword group of the black words and the keyword group of gray words may be stored in databases different from each other.

The keyword determination module 106 in Modification Example 4 includes a first keyword determination module 106A and a second keyword determination module 106B. The first keyword determination module 106A determines whether or not the viewer comment includes first keywords in the first keyword group. In Modification Example 4, description is given of a case in which the keyword group of the black words corresponds to the first keyword group. In Modification Example 4, description is given of a case in which the first keyword determination module 106A determines exact match with the first keywords, but the first keyword determination module 106A may determine partial match or fuzzy match (fuzzy search) with the first keywords.

The second keyword determination module 106B determines whether or not the viewer comment includes second keywords in the second keyword group. In Modification Example 4, description is given of a case in which the keyword group of the gray words corresponds to the second keyword group. That is, description is given of a case in which appropriateness of the first keyword group is lower than appropriateness of the second keyword group, but the appropriateness of the first keyword group may be higher than the appropriateness of the second keyword group. For example, the gray words may correspond to the first keyword group, and the black words may correspond to the second keyword group. The first keyword group and the second keyword group are not limited to the black words and the gray words. For example, any one of the first keyword group and the second keyword group may include white words which are appropriate keywords. In Modification Example 4, description is given of a case in which the second keyword determination module 106B determines exact match with the second keywords, but the second keyword determination module 106B may determine partial match or fuzzy match (fuzzy search) with the second keywords.

The second model M2 in Modification Example 4 has learned the second training data indicating a relationship between a determination result regarding the determination of whether or not a certain second training comment includes the first keywords and a determination result regarding the determination of whether or not this second training comment includes the second keywords, and a ground truth for this second training comment. The meaning of the determination result is similar to that in Modification Example 3. The content included in the second training data is different from that in the at least one embodiment, but the learning method itself is similar to that in the at least one embodiment.

The second estimation module 104 in Modification Example 4 estimates, when the first score is determined not to satisfy the first criterion, whether or not the viewer comment is appropriate based on a first determination result regarding the determination of whether or not the viewer comment includes the first keywords, a second determination result regarding the determination of whether or not the viewer comment includes the second keywords, and the second model M2. For example, the second estimation module 104 inputs the second input data including the first determination result and the second determination result into the second model M2. The second model M2 determines whether or not the second input data satisfies each of the conditions of the plurality of conditional branches. The second model M2 outputs the second estimation result corresponding to the conditions satisfied by the second input data. The second estimation module 104 acquires the second estimation result output from the second model M2, to thereby estimate whether or not the viewer comment is appropriate.

The live distribution system 1 according to Modification Example 4 estimates, when the first score is determined not to satisfy the first criterion, whether or not the viewer comment is appropriate based on the first determination result, the second determination result, and the second model M2. As a result, the estimation accuracy of the second model M2 increases.

Modification Example 5

For example, the keywords described in Modification Example 3 and Modification Example 4 may be prepared for each attribute of products. In the live distribution service in Modification Example 5, a moving image for introducing a product is distributed, and a keyword group is prepared for each attribute relating to the product. For example, in the keyword database DB4 in Modification Example 5, the keyword group is prepared for each attribute of the product. The attribute of the product is information for classifying the product in terms of a certain point of view. The attribute of the product is sometimes referred to as a category or a genre of the product. An independent database may be prepared for each attribute of the products.

The keyword determination module 106 in Modification Example 5 determines whether or not the viewer comment includes keywords based on a keyword group associated with an attribute of a product introduced in the moving image being viewed by the viewer. The attribute of the product may be specified by the distributor, or a product database in which attributes of products are defined may be prepared in the data storage unit 100, and the attribute of the product may be acquired through reference to the product database.

The keyword determination module 106 of Modification Example 5 determines whether or not the viewer comment includes keywords based on a keyword group which is associated with the attribute of the product among the keyword groups in the keyword database DB4 stored in the data storage unit 100. Keyword groups which are associated with attributes other than the attribute of the product are not used for the determination. Such a point that the keyword group to be used for the determination corresponds to the attribute of the product is different from Modification Example 3 and Modification Example 4, but other points are similar to those thereof.

The live distribution system 1 according to Modification Example 5 determines whether or not the viewer comment includes the keywords based on the keyword group associated with the attribute of the product introduced in the moving image being viewed by the viewer. As a result, the second model M2 can execute the estimation corresponding to the attribute of the product, and hence the estimation accuracy of the second model M2 increases. For example, when the attribute of the product is a dress, a poster comment including the word "hip" is often appropriate. However, when the attribute of the product is different, this poster comment may be inappropriate. Thus, the estimation accuracy of the second model M2 is increased by using the keyword group corresponding to the attribute.

Modification Example 6

For example, as illustrated in FIG. 9, the second input data may include a third estimation result of a third model M3 which uses a machine learning method different from those of the first model M1 and the second model M2. In Modification Example 6, there is exemplified a case in which the third model M3 is a model which uses the support vector machine. It is only required that the third model M3 be a model which uses a machine learning method different from those of the first model M1 and the second model M2, and is not limited to the model which uses the support vector machine. For example, the third model M3 may be a model which uses the neural network.

The live distribution system 1 according to the modification 6 includes a third estimation module 107. The third estimation module 107 estimates whether or not the viewer comment is appropriate based on the third model M3 which has learned third training comments. The third model M3 has learned third training data which represents relationships each between the third training comment and a ground truth indicating whether or not this third training comment is appropriate. The third training data is stored in a third training database DB5 stored in the data storage unit 200. As in the at least one embodiment, the third training data may be stored in the data storage unit 200 of the operator terminal 20, and the training of the third model M3 may be executed by the learning module 201. The learning module 201 adjusts parameters of the third model M3 so that when a third training comment included in certain training data is input, the estimation result matching the ground truth included in this third training data is output.

The second estimation module 104 in Modification Example 6 estimates, when the first score is determined not to satisfy the first criterion, whether or not the viewer comment is appropriate based on the estimation result of the third model M3 and the second model M2. For example, the second estimation module 104 inputs the second input data including the third estimation result into the second model M2. The second model M2 determines whether or not the second input data satisfies each of the conditions of the plurality of conditional branches. The second model M2 outputs the second estimation result corresponding to the conditions satisfied by the second input data. The second estimation module 104 acquires the second estimation result output from the second model M2, to thereby estimate whether or not the viewer comment is appropriate.

The live distribution system 1 according to Modification Example 6 estimates, when the first score is determined not to satisfy the first criterion, whether or not the viewer comment is appropriate based on the third estimation result and the second model M2. As a result, the second model M2 can refer to the third estimation result, and hence the estimation accuracy of the second model M2 increases.

Modification Example 7

For example, in the at least one embodiment, description has been given of the case in which the second model M2 is the model which is lower in speed, but is higher in accuracy than the first model M1, but the estimation accuracy of the second model M2 may not be sufficient. In this case, there may be executed estimation which uses a fourth model M4 which uses a machine learning method different from those of the first model M1 and the second model M2. In Modification Example 7, there is exemplified a case in which the fourth model M4 is a model which uses the BERT. The fourth model M4 is only required to be a model which uses a machine learning method different from those of the first model M1 and the second model M2, and is not limited to a model which uses the BERT. For example, the fourth model M4 may be a model which uses the Transformer other than the BERT. The fourth model M4 has learned fourth training data which represents relationships each between a fourth training comment and a ground truth indicating whether or not this fourth training comment is appropriate. The fourth training data is stored in a fourth training database DB6 stored in the data storage unit 200.

The live distribution system 1 according to Modification Example 7 includes a second criterion determination module 108 and a fourth estimation module 109. The second criterion determination module 108 determines whether or not a second score relating to the estimation accuracy of the second model M2 satisfies a predetermined second criterion. The second score is different from the first score in such a point that the second score is a score relating to the estimation accuracy of the second model M2, but is similar to the first score in other points. The second criterion is different from the first criterion in such a point that the second criterion is a criterion relating to the second score, but similar to the first criterion in other points. Thus, the first score, the first criterion, and the first model M1 as used in the description of the first score and the first criterion can be read as the second score, the second criterion, and the second model M2, respectively.

For example, the second criterion determination module 108 acquires the second score output by the second model M2. The second criterion determination module 108 determines whether or not the second score is equal to or higher than a second threshold value, to thereby determine whether or not the second score satisfies the second criterion. The second criterion determination module 108 determines that the second score satisfies the second criterion when the second score is equal to or higher than the second threshold value. The second criterion determination module 108 determines that the second score does not satisfy the second criterion when the second score is lower than the second threshold value.

The fourth estimation module 109 does not execute the estimation based on the fourth model M4 which has learned the fourth training comments when the second score is determined to satisfy the second criterion. The fourth estimation module 109 estimates whether or not the viewer comment is appropriate based on the fourth model M4 when the second score is determined not to satisfy the second criterion. The fourth estimation module 109 does not input the viewer comment into the fourth model M4 when the second score is determined to satisfy the second criterion. The fourth estimation module 109 inputs the viewer comment into the fourth model M4 when the second score is determined not to satisfy the second criterion. The predetermined processing described in the at least one embodiment is executed based on the estimation result of the fourth model M4.

The live distribution system 1 according to Modification Example 7 does not execute the estimation based on the fourth model M4 which has learned the fourth training comments when the second score is determined to satisfy the second criterion, and estimates whether or not the viewer comment is appropriate based on the fourth model M4 when the second score is determined not to satisfy the second criterion. As a result, even when the estimation accuracy of the second model M2 is not high, the estimation accuracy regarding whether or not the viewer comment is appropriate is increased by executing the estimation based on the fourth model M4. Moreover, when the estimation accuracy of the second model M2 is high, the second estimation result is reliable, and hence the processing load on the server 10 can be reduced by avoiding the execution of the estimation based on the fourth model M4.

Modification Example 8

For example, a plurality of second models M2 different from one another in machine learning method or a plurality of second models M2 different from one another in second training data used for the learning may be prepared, and the second models M2 may be used in accordance with the first score. The second estimation module 104 selects, when the first score is determined not to satisfy the first criterion, any one of the plurality of second models M2 based on the first score, and estimates whether or not the viewer comment is appropriate based on this selected second model M2.

It is assumed that relationships each between the first score and the second model M2 are stored in advance in the data storage unit 100. For example, those relationships are defined such that as the first score becomes lower (as the accuracy of the first estimation result becomes lower), a second model M2 having a higher accuracy and a lower speed is selected. The second estimation module 104 is only required to select the second model M2 associated with the first score. The estimation itself based on the second mode M2 is as described in the at least one embodiment. When a second model M2 different from the second model M2 including the conditional branches described in the at least one embodiment is used, it is only required that processing corresponding to a machine learning method of the different second model M2 be executed, to thereby acquire the second estimation result.

The live distribution system 1 according to Modification Example 8 selects, when the first score is determined not to satisfy the first criterion, any one of the plurality of second models M2 based on the first score, and estimates whether or not the viewer comment is appropriate based on this selected second model M2. As a result, the estimation based on the second model M2 corresponding to the first score can be executed, and hence both of the estimation accuracy regarding whether or not the viewer comment is appropriate and the speed of estimating whether or not the viewer comment is appropriate can be achieved in a balanced manner. For example, when the first score does not satisfy the first criterion, but the first estimation result is reliable to a certain degree, a highly accurate second estimation result can be obtained through high-speed processing by using a second model M2 which is highly accurate and high in speed to certain degrees. For example, when the first score is very low, and hence the first estimation result is not reliable at all, a second estimation result which is not obtained very fast but is highly accurate can be obtained by using a second model M2 having a higher accuracy.

Modification Example 9

For example, an inappropriate viewer comment may be input by a specific viewer. Thus, at least one of the first estimation module 102 or the second estimation module 104 may estimate whether or not the viewer comment is appropriate based on a feature relating to the viewer. The feature relating to the viewer is a feature relating to viewer comments input in the past. For example, the feature is acquired such that as the number of times of input of an inappropriate viewer comment in the past by a certain viewer increases, a degree of fraudulence of this viewer increases.

For example, the server 10 refers to the distribution database DB1, to thereby acquire, for each viewer, the first estimation results and the second estimation results of the past viewer comments input by this viewer. The server 10 calculates the feature of the viewer such that the degree of fraudulence of the viewer increases as the number of inappropriate viewer comments represented by the first estimation results and the second estimation results increases. In Modification Example 9, description is given of the case in which the degree of fraudulence of the viewer is used as the feature, but a degree of authenticity of the viewer may be used as the feature. The server 10 may acquire a feature corresponding to input records of comments of the viewer in other services such as social media in addition to the live distribution service.

In Modification Example 9, description is given of a case in which both of the first estimation module 102 and the second estimation module 104 estimate whether or not the viewer comment is appropriate based on the feature relating to the viewer, but only any one of the first estimation module 102 and the second estimation module 104 may estimate whether or not the viewer comment is appropriate based on the feature relating to the viewer. In Modification Example 9, the first training data and the second training data also include the feature relating to the viewers. The first model M1 and the second model M2 have learned the feature relating to the viewers.

For example, the first estimation module 102 inputs the first input data including the feature relating to the viewer into the first model M1. The first model M1 outputs the first estimation result in accordance with the feature relating to the viewer. The first estimation module 102 acquires the first estimation result output from the first model M1. The second estimation module 104 inputs the second input data including the feature relating to the viewer into the second model M2. The second model M2 outputs the second estimation result in accordance with the feature relating to the viewer. The second estimation module 104 acquires the second estimation result output from the second model M2.

Instead of the feature of the viewer being included in the first input data or the second input data, a plurality of first models M1 and a plurality of second models M2 may be prepared, and the first model M1 and the second model M2 corresponding to the feature of the viewer may be used. For example, the first estimation module 102 may select a first model M1 having a higher accuracy as the degree of fraudulence of the viewer increases. The second estimation module 104 may select a second model M2 having a higher accuracy as the degree of fraudulence of the viewer increases. That is, the first model M1 and the second model M2 may selectively be used in accordance with the feature of the viewer.

The live distribution system 1 according to Modification Example 9 estimates whether or not the viewer comment is appropriate based on the feature relating to the viewer. As a result, the feature relating to the viewer can also be considered, and hence the estimation accuracy for the viewer comment increases. For example, it is possible to execute, for a viewer who usually inputs inappropriate viewer comments, the estimation through use of the first model M1 and the second model M2 which emphasize not the speed, but the accuracy.

Modification Example 10

For example, in the at least one embodiment, there has been exemplified the case in which the viewer comment estimated as inappropriate is forwarded to the check by the operator, but the viewer comment estimated as inappropriate is not required to be forwarded to the check by the operator, and may be inhibited from being displayed in the window W in the first place. Further, when the viewer comment estimated as inappropriate by the first model M1 and the second model M2 is determined as appropriate by the operator, this viewer comment may be displayed on the window W.

The live distribution system 1 according to Modification Example 10 includes a display control module 110. The display control module 110 controls, based on the estimation result of at least one of the first model M1 or the second model M2, whether or not the viewer comment is to be displayed. For example, for a viewer comment having the first score satisfying the first criterion, the display control module 110 controls whether or not the viewer comment is to be displayed based on the estimation result of the first model M1. The display control module 110 does not display a viewer comment estimated as inappropriate by the first model M1 on the window W, and displays a viewer comment estimated as appropriate by the first model M1 on the window W.

For example, for a viewer comment having the first score not satisfying the first criterion, the display control module 110 controls whether or not the viewer comment is to be displayed based on the estimation result of the second model M2. The display control module 110 does not display a viewer comment estimated as inappropriate by the second model M2 on the window W, and displays a viewer comment estimated as appropriate by the second model M2 on the window W. A viewer comment which is estimated as appropriate by the first model M1 or the second model M2 but is determined as inappropriate through the check by the operator may be deleted.

The live distribution system 1 according to Modification Example 10 controls whether or not the viewer comment is to be displayed based on the estimation result of at least one of the first model M1 or the second model M2. As a result, it is possible to prevent an inappropriate viewer comment from being disclosed.

Other Modification Examples

For example, the modification examples described above may be combined with one another.

For example, the functions described as being implemented by the server 10 may be implemented by the operator terminal 20, the distributor terminal 30, the viewer terminal 40, or another computer. For example, the function described as being implemented by one computer may be implemented by a plurality of computers in a distributed manner. It is only required that each function be implemented by at least one computer.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A live distribution system, comprising at least one processor configured to:
   acquire a viewer comment input by a viewer of a live distribution service;
   estimate whether the viewer comment is appropriate based on a first model that has learned a first training comment;
   determine whether a first score relating to an estimation accuracy of the first model satisfies a predetermined first criterion;
   avoid, when the first score is determined to satisfy the predetermined first criterion, estimation based on a second model that has learned a second training comment; and
   estimate, when the first score is determined not to satisfy the predetermined first criterion, whether the viewer comment is appropriate based on the second model.

2. The live distribution system according to claim 1, wherein the at least one processor is configured to estimate whether the viewer comment is appropriate based on an estimation result of the first model and on the second model when the first score is determined not to satisfy the predetermined first criterion.

3. The live distribution system according to claim 1, wherein the at least one processor is configured to estimate whether the viewer comment is appropriate based on the first score and on the second model when the first score is determined not to satisfy the predetermined first criterion.

4. The live distribution system according to claim 1, wherein the at least one processor is configured to:
   determine whether the viewer comment includes a predetermined keyword; and
   estimate whether the viewer comment is appropriate based on a determination result regarding the determination of whether the viewer comment includes the predetermined keyword and on the second model when the first score is determined not to satisfy the predetermined first criterion.

5. The live distribution system according to claim 4, wherein the at least one processor is configured to:
   determine whether the viewer comment includes a first keyword in a first keyword group;
   determine whether the viewer comment includes a second keyword in a second keyword group; and
   estimate whether the viewer comment is appropriate based on a first determination result regarding the determination of whether the viewer comment includes the first keyword, a second determination result regarding the determination of whether the viewer comment includes the second keyword, and the second model when the first score is determined not to satisfy the predetermined first criterion.

6. The live distribution system according to claim 4,
   wherein the live distribution service is configured to distribute a moving image for introducing a product, and a keyword group is prepared for each attribute relating to the product, and
   wherein the at least one processor is configured to determine whether the viewer comment includes the predetermined keyword based on the keyword group associated with the each attribute of the product introduced in the moving image being viewed by the viewer.

7. The live distribution system according to claim 1, wherein the at least one processor is configured to:
   estimate whether the viewer comment is appropriate based on a third model which has learned a third training comment; and
   estimate whether the viewer comment is appropriate based on an estimation result of the third model and on the second model when the first score is determined not to satisfy the predetermined first criterion.

8. The live distribution system according to claim 1, wherein the first model is a model higher in speed than the second model.

9. The live distribution system according to claim 1,
   wherein the second model is a model including a conditional branch, and
   wherein the at least one processor is configured to acquire output corresponding to the conditional branch satisfied by the viewer comment when the first score is determined not to satisfy the predetermined first criterion, to thereby estimate whether the viewer comment is appropriate.

10. The live distribution system according to claim 1, wherein the at least one processor is configured to:
    determine whether a second score relating to an estimation accuracy of the second model satisfies a predetermined second criterion;
    avoid estimation based on a fourth model that has learned a fourth training comment when the second score is determined to satisfy the predetermined second criterion; and
    estimate whether the viewer comment is appropriate based on the fourth model when the second score is determined not to satisfy the predetermined second criterion.

11. The live distribution system according to claim 1, wherein the at least one processor is configured to select any one of a plurality of the second models based on the first score when the first score is determined not to satisfy the predetermined first criterion, and to estimate whether the viewer comment is appropriate based on the selected one of the plurality of the second models.

12. The live distribution system according to claim 1, wherein the at least one processor is configured to estimate whether the viewer comment is appropriate based on a feature relating to the viewer.

13. The live distribution system according to claim 1, wherein the at least one processor is configured to control whether to display the viewer comment based on an estimation result of at least one of the first model or the second model.

14. An estimation method, comprising:
    acquiring a viewer comment input by a viewer of a live distribution service;
    estimating whether the viewer comment is appropriate based on a first model that has learned a first training comment;
    determining whether a first score relating to an estimation accuracy of the first model satisfies a predetermined first criterion;
    avoiding, when the first score is determined to satisfy the predetermined first criterion, estimation based on a second model that has learned a second training comment; and
    estimating, when the first score is determined not to satisfy the predetermined first criterion, whether the viewer comment is appropriate based on the second model.

15. A non-transitory information storage medium having stored thereon a program for causing a computer to:
acquire a viewer comment input by a viewer of a live distribution service;
estimate whether the viewer comment is appropriate based on a first model that has learned a first training comment;
determine whether a first score relating to an estimation accuracy of the first model satisfies a predetermined first criterion;
avoid, when the first score is determined to satisfy the predetermined first criterion, estimation based on a second model that has learned a second training comment; and
estimate, when the first score is determined not to satisfy the predetermined first criterion, whether the viewer comment is appropriate based on the second model.

* * * * *